United States Patent [19]

DeCrescent

[11] 4,180,726
[45] Dec. 25, 1979

[54] SYSTEM FOR MEASURING CHARACTERISTICS OF AN OBJECT'S MOTION

[76] Inventor: Ronald DeCrescent, 17613 Sunburst St., Northridge, Calif. 91325

[21] Appl. No.: 874,110

[22] Filed: Feb. 1, 1978

[51] Int. Cl.² .......................................... G01D 21/04
[52] U.S. Cl. ............................. 250/222 R; 324/178
[58] Field of Search ............... 324/175, 178; 250/221, 250/222, 223 R, 214 R

[56] References Cited

U.S. PATENT DOCUMENTS

| | | | |
|---|---|---|---|
| 3,805,061 | 4/1974 | De Missimy et al. | 250/221 |
| 3,907,429 | 9/1975 | Kuhn et al. | 250/222 R |
| 4,128,761 | 12/1978 | Oehler | 324/178 |

Primary Examiner—David C. Nelms
Attorney, Agent, or Firm—I. Morley Drucker

[57] ABSTRACT

One embodiment of the subject invention comprises a device in which the passage of an object through first and second closely spaced parallel, pulsed, infrared beams is detected, to provide an elapsed time and/or speed indication. The beams are synchronously pulsed at a sufficiently high frequency that the interpulse periods are relatively short compared to the anticipated minimum elapsed time of the passage of the object through the beams, and beam interruptions are detected within a single interpulse period. In one embodiment of the invention, a third beam, in conjunction with one of the other two beams, is used to measure a second speed value, which is compared to the speed value measured between the first and second beams so as to ascertain if the object is accelerating or decelerating. Measured speed values are displayed on a multiplexed, multi-segment display, as well as being applied to a calculator or processor unit for the computation of preselected functions of the measured speed values. The display also provides an indication as to whether the object is accelerating or decelerating.

16 Claims, 12 Drawing Figures

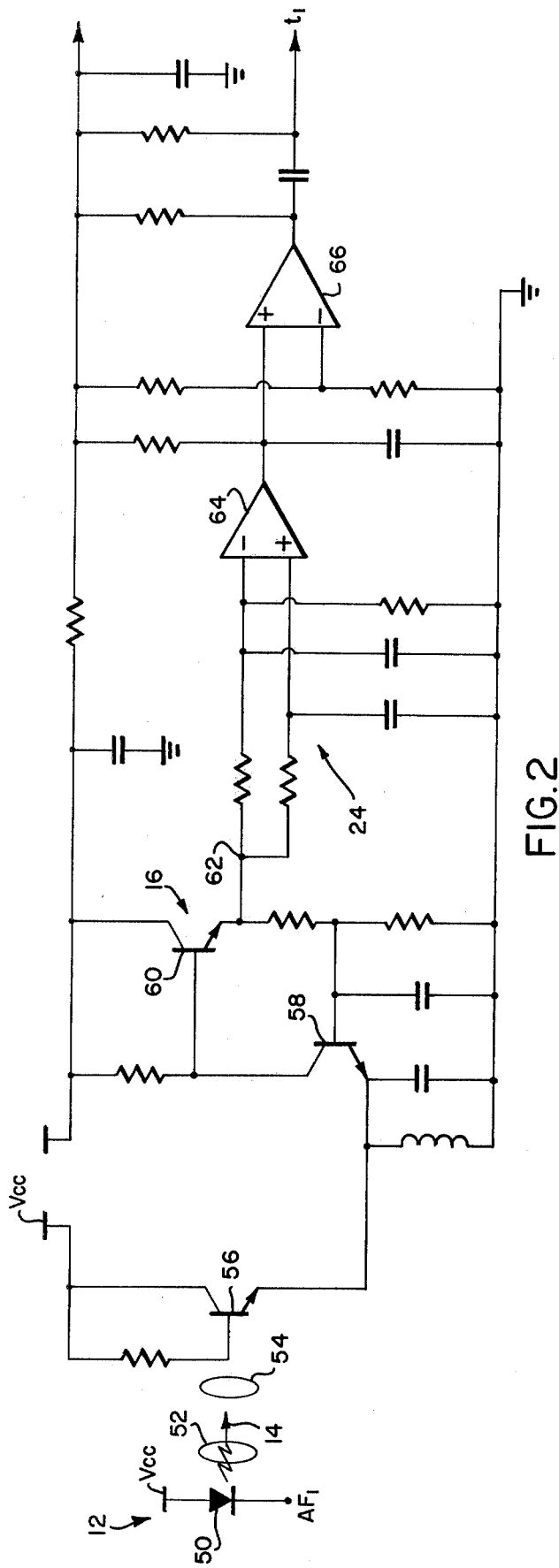
FIG.2
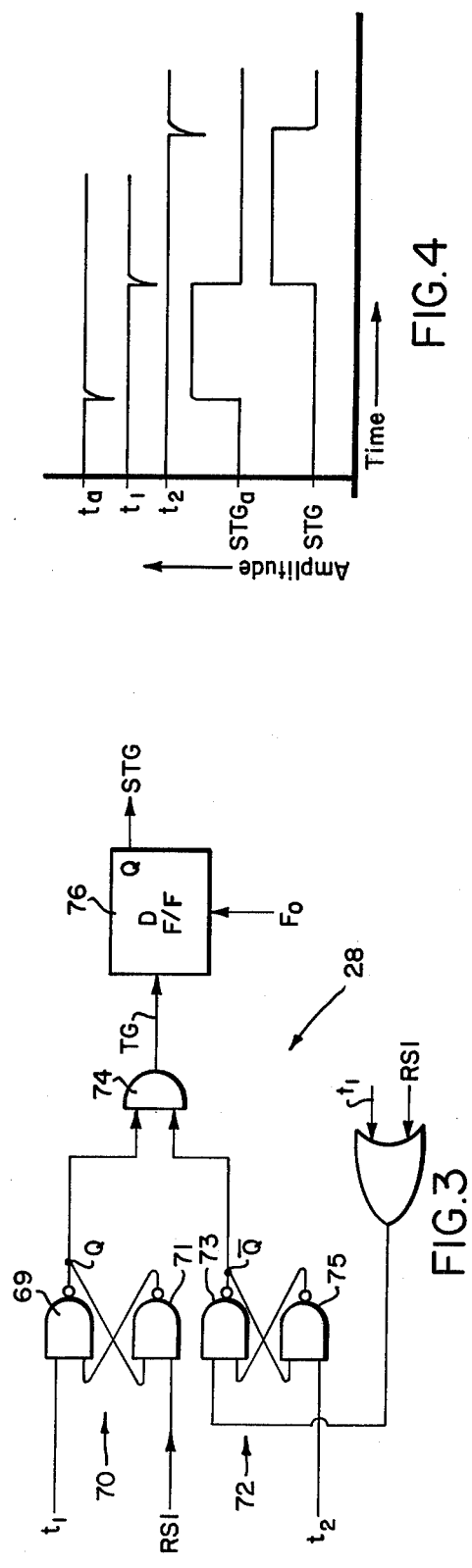
FIG.4
FIG.3

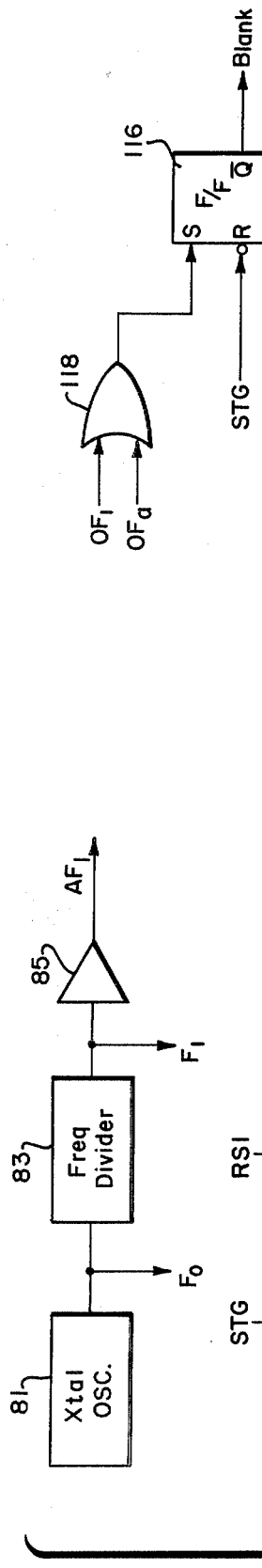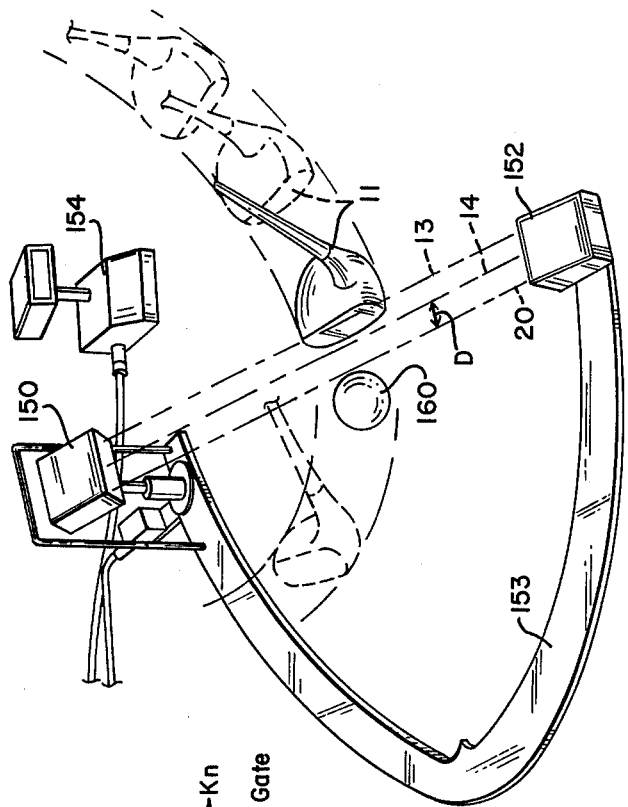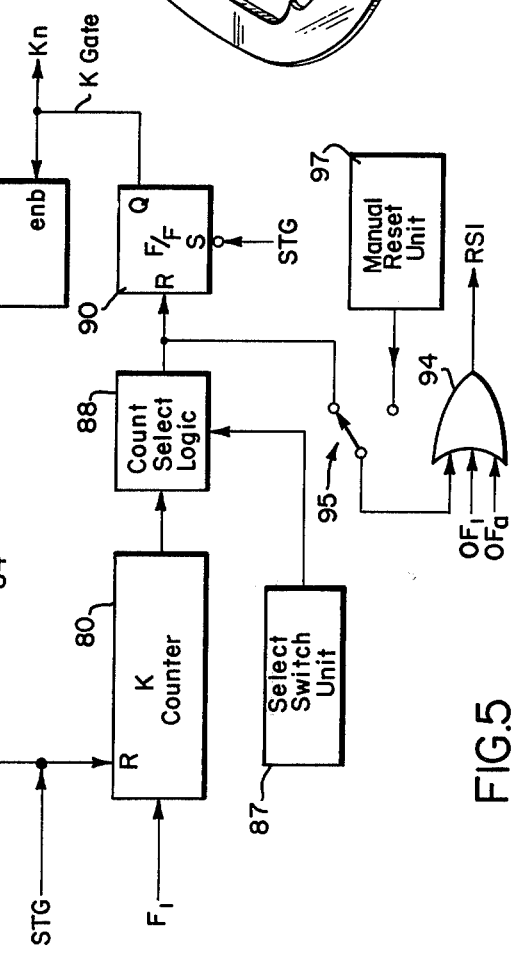

SYSTEM FOR MEASURING CHARACTERISTICS OF AN OBJECT'S MOTION

BACKGROUND OF THE INVENTION

The subject invention relates to devices for measuring characteristics of an object's motion through a predetermined zone, and particularly to highly accurate, high-speed time trap devices, which are adapted for use as training aids in sporting type activities or for use in evaluating sporting equipment. Such applications include, for example, training devices for golf, tennis, baseball, football, squash, soccer, volleyball, bowling, boxing, and karate, wherein speed and acceleration characteristics of an object's motion, such as for a club, racket, ball, foot, or hand, are displayed as an aid in performance evaluation.

Systems which employ pulsed, infrared beams to measure elapsed time between interruptions of the beams are known in the art. For example, U.S. Pat. No. 3,932,746 describes an elapsed time meter which incorporates pulsed, infrared beams to monitor remotely located start and stop gates which would seem to be widely separated and arbitrarily employed. Also, in said system, the pulsing of the beams (the audio frequency range is recommended therein) appears to be for the purpose of improving the receiver's signal to noise ratio and for alignment, and not as a primary factor in establishing the measurement accuracy of the system. Although the just referenced and similar type systems may be quite satisfactory for their intended purposes, e.g. timing skiing events, a significant aspect of the subject invention is the recognition that there exists a wide range of applications which require low cost, highly accurate, and reliable systems for measuring the speed and/or acceleration of high speed objects over a very short distance of interest, e.g. the motion of a golf club, ball bat, or foot as it approaches contact with the ball.

Other prior art devices, such as the velocity meter disclosed in U.S. Pat. No. 3,685,909, relate to systems wherein a par of parallel, non-pulsed, visible light beams is used to provide beam interruption data to analog circuits which produce a meter indication of the velocity of a golf clubhead as it passes through the beams. Since no finite time increments are encoded on the non-pulsed beams, the accuracy of this type of velocity meter would seem to be dependent on the varying characteristics of the analog circuits employed. U.S. Pat. Nos. 2,571,974; 2,825,569; 2,933,681; 3,020,049; and 3,601,408 are representative of the historical development of the art of golf training devices. U.S. Pat. No. 3,373,612 discloses a mechanical golfer for testing balls; U.S. Pat. No. 3,117,451 describes a photoelectric baseball batter's swing analyzer, and U.S. Pat. No. 3,016,812 illustrates a motion analyzer which relates to bowling activities. As will become evident from the following description, these devices do not provide the accuracy, versatility, reliability, and economy available from systems employing the features of the subject invention.

SUMMARY OF THE INVENTION

Systems for measuring characteristics of an object's motion through a preselected zone, in accordance with the subject invention, include a transmitter for transmitting first and second substantially parallel, synchronously pulsed beams of electromagnetic energy such that the beams are approximately orthogonal to the path of the object. The pulse repetition frequency of the beams is preselected at a frequency sufficiently high that the interval between pulses is relatively short compared to the elapsed time of the object passing through the preselected zone. A receiver is disposed so that, in the absence of a beam interruption by the object, a portion of the transmitted energy in each of said beams is received and converted to first and second output signals, respectively. A pair of missing pulse detectors responds to the output signals from the receiver and controls a time gate generator which produces a time gate signal that commences during the interpulse interval following the first missing pulse in the received energy from the first beam, and which terminates during the interpulse interval following the first missing pulse in the received energy from the second beam. A speed subsystem responds to the timing gate signal for producing a signal which is indicative of the speed of the object as it passes through the beams; and a display unit responds to the speed signal for displaying an indication thereof. In some embodiments of the invention, the transmitter and receiver are rigidly interconnected to ensure optical alignment therebetween.

The capability of detecting the first missing pulse in the received energy, together with the synchronously pulsing of the two beams, allow the elapsed time measurement accuracy of systems in accordance with the subject invention to be less than one interpulse period. For example, one embodiment of the subject invention which uses energy beams pulsed at 100,000 pulses per second can measure to an accuracy of greater than 99 percent, the speed of objects with widths as small as 0.25 inches, as they travel in excess of 100 miles per hour.

A "data-lock" feature of the subject invention inhibits the formation of a subsequent time gate signal for a period established by preselected criteria. This feature causes the system to respond only to the leading edge of an object as it passes through the sensing beams. For example, the "data-lock" feature allows measurement of the speed of a karate blow near an impact area even though the hand or arm may continuously block the sensing beams following the blow. Similarly, debris such as grass and dirt which might result from a golf swing will not degrade the measurement accuracy of the subject invention.

In accordance with one embodiment of the subject invention, the time gate generator and speed subsystem include circuit arrangements for sensing a time gate signal, which exceeds a preselected duration and for inhibiting the display of a speed value resulting therefrom. This feature eliminates the display of non-significant measurements and reduces the power drain of the display unit if an object is caused to pass through the beams in a reverse direction, or if an object passes through beams in a forward direction at a speed that is below the range of speeds being measured. For example, in a golf application, this feature will "turn off" the display if the club has too slow a speed in the forward direction through the beams, or if the club is moved at any speed in the reverse direction through the beams. Hence a convenient way of setting the display to "standby" is also provided. Display power is further conserved by an arrangement for inhibiting the display of zero values in the most significant digits of the display, and by rapid on-off sequencing of the display digits such that continuous display currents are not required. Also means are provided for sensing low prime power voltage, e.g. from batteries, and for causing a flashing of the display as an indication thereof.

The speed computation subsystem of the invention comprises an accurate and cost effective digital arrangement wherein a first counter counts clock pulses $F_1$ during the period of the time gate signal to produce a signal N; a second counter arrangement responds to second clock pulses $F_o$ and the signal N to produce an output pulse train representative of $F_o/N$; a third counter arrangement produces a time scale factor gate signal K which has a predetermined duration; and a fourth counter arrangement counts the $F_o/N$ pulses during the duration of the K gate, so as to produce a count proportional to the speed of the object as it passes through the zone between the sensing beams.

In accordance with one embodiment of the invention, the transmitter includes means for transmitting a third pulsed beam of infrared energy which is synchronized with and parallel to the first and second beams, and means are provided for computing the speed of the object as it traverses each of the two zones or "speed traps" defined by the three beams. A comparator circuit compares the two computed speed values to provide output signals which are indicative of the acceleration or deceleration of the object as it passes between the three beams. It is noted, that in some applications such as golf, the information as to whether the club is accelerating or decelerating at a given point is useful in evaluating the effectiveness of the swing.

The subject invention can include a calculation arrangement for computing predesignated functions of the measured speed, such as, for example, the estimated flight distance of a golf ball if it were driven by a club whose speed is measured and whose parameters, such as clubhead weight for example, are applied as part of the designated function.

Other advantages of the invention include its use of digital techniques to perform calculations so that they are based primarily on an accurate, fixed distance between parallel energy beams. These factors, combined with the high-speed and synchronized triggering techniques noted above, enable the device to provide the herein cited accuracies without calibration. Further, the subject system is small, light weight, and portable and utilizes solid state circuitry throughout so that reliability is high and power consumption is low. The low power consumption feature makes it practical to employ batteries as the prime power source. The pulsed infrared beam configuration of the invention permits use of the system in any ambient light condition inasmuch as the system is unaffected by bright sunlight and can be used for daylight outdoor functions, as well as in total darkness.

It is therefore a primary object of the subject invention to provide a new and improved system which is accurate and cost effective, for measuring characteristics of an object's motion along a path.

Another object of the invention is to provide a system for measuring the speed of time of an object as it passes between closely spaced beams such that the measurement accuracy is established primarily by preselected stable parameters.

A further object of the invention is to provide an accurate, practical, speed and acceleration measuring system, which is readily adaptable to various applications including numerous sport training uses.

A still further object is to provide a speed measuring system whose accuracy is not affected by the maximum width of the object, or by the object being stopped in the sensing beams, or by debris scattered into the beams.

Yet another object is to provide a speed measuring system having a digital format display of the measured value which can be set to "standby" by interrupting the sensing means out of the normal sequence or by interrupting the beams at less than a preselected rate, for example, by swinging a golf club in reverse order through the beams or by slowly swinging the club through the beams.

A further object of the invention is to provide a speed measurement system which may optionally include a computation unit wherein other factors pertaining to the characteristics of the object are computed as a function of the measured speed.

BRIEF DESCRIPTION OF THE DRAWINGS

The novel feature of this invention, as well as the invention itself, will be better understood from the accompanying description taken in conjunction with the accompanying drawings in which like reference characters refer to like parts, and in which:

FIG. 2 is a schematic diagram of a transmitter, receiver, and missing pulse detector suitable for use in the system of FIG. 1:

FIG. 3 is a schematic diagram of a timing gate generator suitable for use in the system of FIG. 1;

FIG. 4 depicts timing waveforms useful for explaining the operation of the system of FIG. 1;

FIGS. 5 and 6 are block diagrams of the speed subsystem shown in FIG. 1;

FIG. 7 is a pictorial view of one embodiment of the subject invention;

DESCRIPTION OF THE PREFERRED EMBODIMENTS

Figure 1:
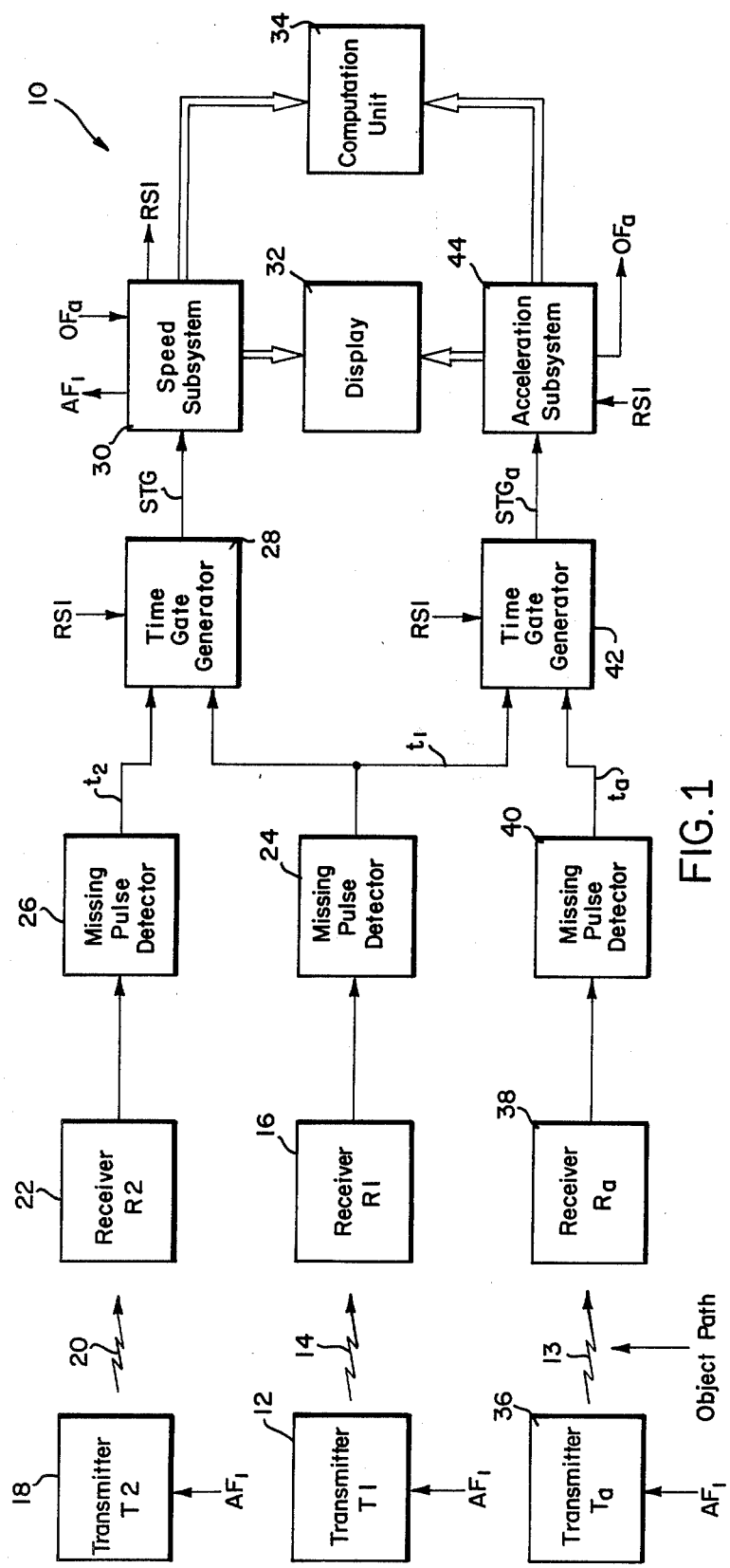
FIG. 1 is a block diagram of one embodiment of a system for measuring characteristics of an object's motion in accordance with the subject invention.

Referring first primarily to FIG. 1, the there illustrated system 10 for measuring characteristics of an object's motion includes a transmitter 12 for transmitting a first pulsed, infrared energy beam 14 to a receiver 16; and a transmitter 18 for transmitting a second pulsed, infrared energy beam 20 to receiver 22. The transmitters and receivers are disposed such that the distance between beams 14 and 20 is a preselected rigidly fixed value. Transmitters 12 and 14 are synchronously pulsed at a preselected pulse repetition frequency in response to an applied train of synchronizing clock signals $AF_1$. Receiver 16 provides output signals indicative of the energy received thereby, to a missing pulse detector 24 which produces a trigger pulse $t_1$ commencing during the interpulse period following the first missing pulse in the received energy from beam 14. Similarly a pulse detector 26 produces a trigger pulse $t_2$ which commences during the interpulse period following the first missing pulse in the received energy from beam 20. Timing gate generator 28 produces a time gate signal (STG) during the interval between trigger pulses $t_1$ and $t_2$, and applies the STG gate signal to a speed subsystem 30 wherein the speed of an object 11 (FIG. 7) is computed as a function of the time it took the object to travel the distance (D) between beams 14 and 20. Unit 32 displays the speed value computed by speed subsystem 30. A similar display unit (not shown) may be employed to display the elapsed time value represented by the time gate signal (STG).

As shown in FIG. 2, transmitter 12 comprises a light emitting diode 50 coupled to a source of positive dc potential Vcc and to a source of synchronized clock pulses $AF_1$. Of course, any suitable source of infrared energy, such as, for example, a diode laser may be used in lieu of light emitting diode 50. The output infrared energy pulses are applied through an output lens 52 of the transmitter unit to an input lens 54 of the receiver unit 16. The receiver includes a phototransistor 56 which converts the received light energy to electrical signals which are processed through the circuits which include transistors 58 and 60, and are then applied through junction 62 to missing pulse detector 24. Any suitable infrared sensitive receiving device, such as for example, a photodiode or field effect phototransistor may be used in lieu of phototransistor 56. The circuitry associated with transistors 56 and 58 operates to remove (shunt) the dc component of the output signal from phototransistor 56 so as to neutralize the effects of ambient light on the operation of the receiver. The circuitry associated with transistors 58 and 60 stabilizes the bias points of the transistors so as to make the receiver independent (within preselect limits) of any variations in the gain of its transistors, and to impart power gain to the output signal from phototransistor 56. Comparators 64 and 66 and the components associated therewith comprise missing pulse detector 24 which develops a sharp pulse $t_1$ within, for example, 5 microseconds of the interruption of the beam 14.

Timing gate generator 28 of FIG. 1 is shown in FIG. 3 as comprised of R-S type flip-flops 70 and 72, AND gate 74, and D type flip-flop 76. Flip-flop 70 which consists of NAND gates 69 and 71 is set by the trigger pulse $t_1$; and flip-flop 72 which is comprised of NAND gates 73 and 75 is reset by the trigger pulse $t_2$. The remaining inputs to flip-flop 70 and 72 are connected to form a reset input for the time gate generator in such a manner that each flip-flop performs as a storage latch and cannot, after triggering, be activated by additional signals until reset flip-flop 70 is reset by signal RS1 (from FIG. 5) and flip-flop 72 is reset the output signal from OR gate 77. Trigger pulse $t_1$ and signal RS1 are applied to the input terminals of OR gate 77. The Q and $\bar{Q}$ outputs of flip-flops 70 and 72, respectively, are AND'ed by gate 74 to generate a rectangular pulse TG whose leading edge rises with $t_1$, and whose trailing edge falls with $t_2$. Hence the duration of the signal TG is representative of the elapsed time between the interruption of beams 14 and 20 (FIG. 1). The D type flip-flop 76 produces synchronized time gate signal (STG) which commences on the leading edge of the first synchronous $F_o$ clock pulse (from FIG. 5) after the start of the TG gate, and terminates on the leading edge of the first synchronous $F_o$ pulse following the end of the TG gate. The timing relationship between signals $t_1$, $t_2$, and STG is depicted in FIG. 4.

Referring now primarily to FIG. 5, the system 10 (FIG. 1) is synchronized by crystal-controlled master oscillator (clock) 81 which produces a series of output pulses ($F_o$) at a rate of 1 Mhz, for example. Frequency divider circuit 83 may be a "divide by 10" circuit, for example, so that its output pulses are at a rate of 100 Khz. The signals $F_1$ are amplified in amplifier 85 and applied as signals $AF_1$ to control the transmitters of FIG. 1. The transmitted signals, return trigger pulses, and computation logic circuits are all synchronized so as to make possible the system's high degree of accuracy. Time counter 82 counts the $F_1$ clock pulses during the period it is "enabled" by the STG signal applied from FIG. 3, and therefore the count N, at the end of the STG pulse, is indicative of the time between interruptions of beams 14 and 20 (FIG. 1). This count may be displayed as an elapsed time indication, i.e. an indication of the time it takes the object to pass through the zone defined by beams 14 and 20, by any suitable digital display system (not shown). Divider-counter 84 is "jammed" loaded with count N and clocked at frequency $F_o$, so as to generate a series of pulses having a frequency of $F_o/N$. Hence, the output from counter 84 is a scaled reciprocal of N. Counter 80 is clocked by clock pulses $F_1$ to generate a preselected time base scale factor period. Both counters 84 and 80 are held at reset for the duration of the STG signal. Depending upon the distance D between the sensing beams and the speed units desired, for example, miles per hour, kilometers per hour, feet per second, or meters per second, the count select logic unit 88 produces an output signal on a preselected count from counter 80. A select signal is applied from a switch unit 87 to count select logic unit 88, and unit 88 responds to the select signal to provide an output signal on the count of counter 80 which is indicated by the value of the select signal. Flip-flop 90 is set on the trailing edge of the STG signal and is reset by the output from count select logic unit 88. Hence, the output from flip-flop 90 (K gate) starts on the trailing edge of the STG signal and has a preselected duration, for example, a duration of 160 milliseconds. Counter 92 counts the $F_o/N$ pulses during the period it is "enabled" by the K gate ($K_n$), and the count held in counter 92 is indicative of the speed of the object as it passes between beams 14 and 20 (FIG. 1).

The output signal from logic unit 88 which is coincident in time with the falling edge of the K gate is applied to one input terminal of a switch 95 and the output signal from a manual reset unit 97 is applied to the other input terminal of switch 95. The output signal from switch 95 is OR'ed in gate 94 with signals $OF_1$ and $OF_a$ to produce a DATA LOCK RESET pulse which is designated RS1, and is applied to the reset circuits of FIG. 3. The inclusion of switch 95 allows for a controlled "hold mode" wherein the data lock reset pulse is delayed until the manually controlled output signal from unit 97 is produced. This feature allows for selectively "holding" previous measurements even though there are subsequent beam interruptions following the K gate period, and is particularly adaptable to retaining measurements in teaching situations. The signal $OF_1$ is an output from time counter 82 which indicates overflow of the counter pulse occurring after a preselected time counting period, for example 10 milliseconds. The signal $OF_a$ is produced by a similar time counter in the acceleration subassembly 44 (FIG. 1) which will be described hereafter. Hence, the time gate generator in FIG. 3 is not reset to accept new data, i.e., new data is "locked out" until the time counters overflow or, with switch 95 in the position shown, until the end of the computation period (end of K gate). The RS1 signal is also used to reset the time counter 82. The speed counter 92 is reset by the STG pulse.

Figure 8:
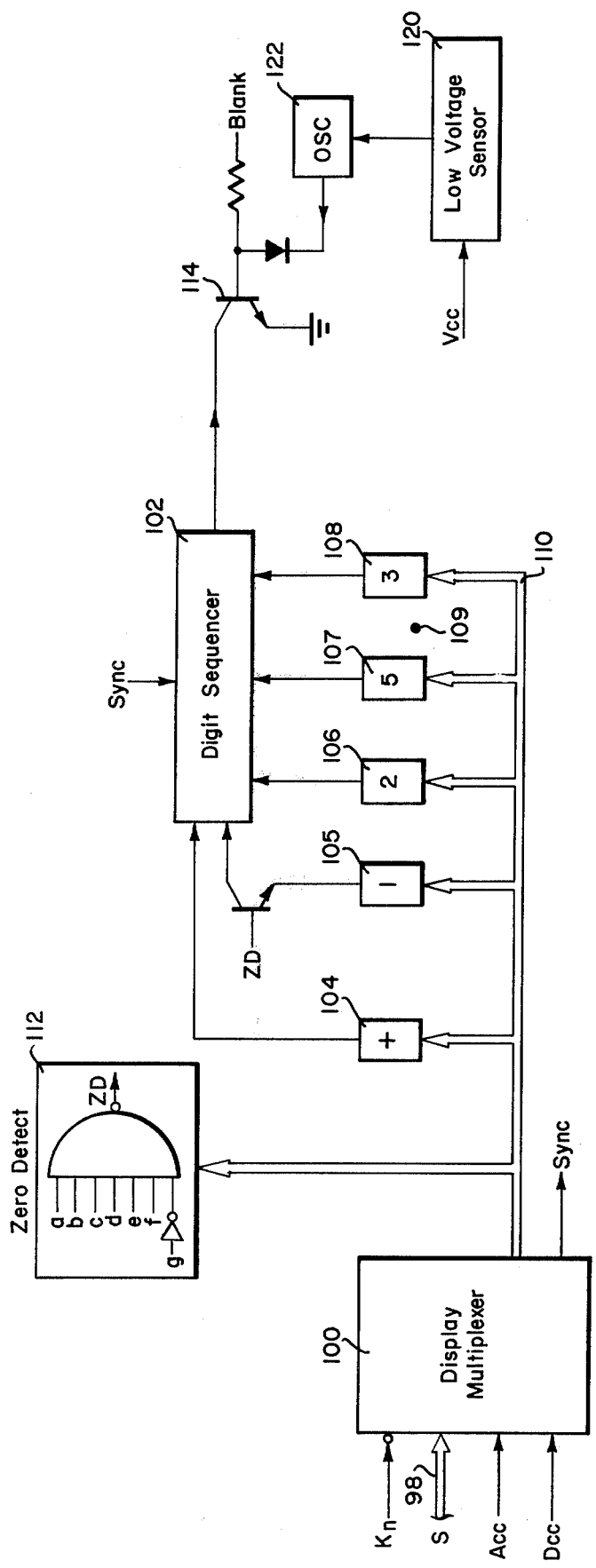
FIG. 8 is a block diagram of the display unit shown in FIG. 1.
Figure 9:
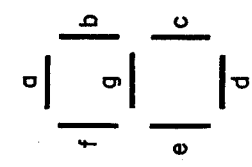
FIG. 9 is a diagram depicting the arrangement of one digit of the display of FIG. 8.

The output signal from speed counter 92 is applied on a plurality of parallel leads, indicated generally by reference number 98 to a display multiplexer unit 100 of FIG. 8. Signals designated Acc and Dcc for acceleration and deceleration are also provided from acceleration subsystem 44 (FIG. 1). Following the falling edge of the K gate ($K_n$), multiplexer unit 100 samples the applied data signals, converts them to the proper format for controlling display elements 104 through 108, and in conjunction with digit sequencer 102 causes the applied data to be sequentially displayed. For example, if the measured speed value is 125.3 miles per hour, unit 100 applies signals on data bus 110 so that the element of display unit 108 will be illuminated in the form of a number "3". If units 105 through 108 are comprised of a plurality of light emitting diodes (LEDs) arranged as shown in FIG. 9, for example, the signals which control illumination of LEDs a, b, c, d and g will be applied from display multiplexer 100 to display unit 108. During the time the data for the least significant digit is applied to the display unit, the digit sequencer 102 only enables the return path for currents through the LEDS of display element 108. Similarly, when data corresponding to the other digits is transmitted on bus 110, the sequencer 102 enables the appropriate display unit. A fixed decimal point is displayed at a position 109 between units 107 and 108. The multiplexing rate of the display is above the "flicker" frequency so that the sequential display format, one display unit at a time, is not noticeable by a viewer; however, less display power is consumed than if all display units were continuously illuminated.

Display unit 104 is a "half" unit which displays a plus or a minus sign as an indication of positive or negative acceleration, respectively.

Zero detect unit 112 provides an output signal (ZD) when the signals to all LEDs except LED "g" are "high". The zero detect signal controls the return current path for unit 105 so as to inhibit the display of a zero value for the most significant digit. This zero detect feature is provided to conserve prime power. Although only the circuitry for blanking the most significant digit is shown in FIG. 8, it will be appreciated that all "leading" zeros may be suppressed. For example, circuit 112 could also be used to sense a zero in the data for display unit 106, and if a zero is also sensed in the data for display unit 105, then both display units would be blanked. Alternatively, the circuitry for zero suppression may be incorporated within display multiplexer 100.

In response to a "blank" signal applied from FIG. 6, transistor 114 (FIG. 8) interrupts the return current paths to all display units when the blank signal is low. The blank signal is provided from flip-flop 116 of FIG. 6 if the "overflow" of the time counter of either the speed (FIG. 5) or the acceleration (FIG. 12) subsystems is indicated by the output signal from OR gate 118. A high output signal from gate 118 indicates that the beams 13, 14 and 20 were interrupted out of the normal sequence or the beams were interrupted by an object whose speed, for example less than 10 miles per hour, is below a preselected value established by the maximum count capacity of the time counter. Instead of using the overflow signals to produce the reset RS1 signal (FIG. 5) and the blank signal (FIG. 6), any preselected count from the time counters could be sensed to provide the reset and blank signals for speeds below preselected values.

Again, referring primarily to FIG. 8, a low voltage sensor 120, which is particularly adapted to battery powered embodiments of the invention, monitors the level of prime power voltage $V_{cc}$ and enables oscillator 122 when voltage $V_{cc}$ is below a preselected value. Oscillator 122, when enabled, periodically grounds the base of transistor 114 causing the display to flash so as to indicate low prime power voltage. For example, the flashing of the display indicates that the system's batteries should be re-charged.

Figure 10:
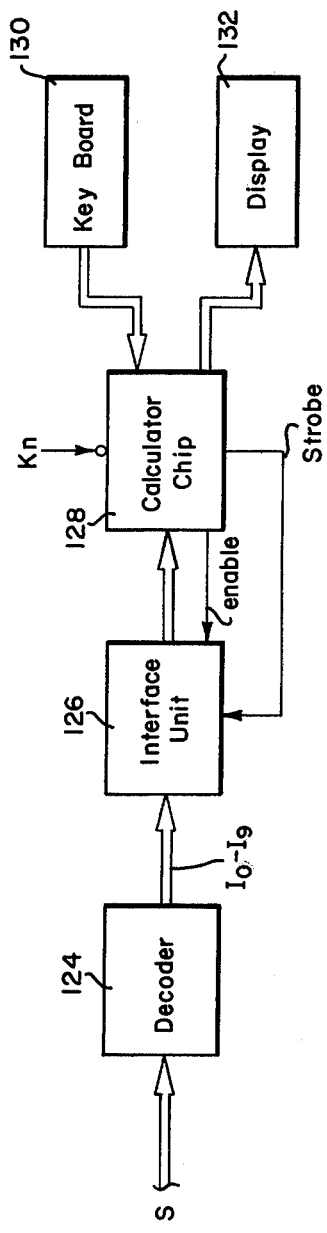
FIG. 10 is a block diagram of the computation unit of FIG. 1.

Referring now primarily to FIG. 10, a decoder 124 converts the speed signal applied from counter 92 (FIG. 5) to decimal signals which are applied through an interface unit 126 to a suitable calculator "chip" 128. Keyboard unit 130 allows for designating functions of the speed value which are to be computed, and for providing values of the designated speed functions; for example, to compute an estimate of the flight distance of a golf ball driven by a golf club whose speed is measured. Keyboard 130 may be used, for example, to designate that the distance calculation is to be performed and to specify parameters such as club length, head weight, etc. The equation used to compute the distance estimate may be preprogrammed in calculator 128, and selected by an input command from the keyboard 130.

Figure 11:
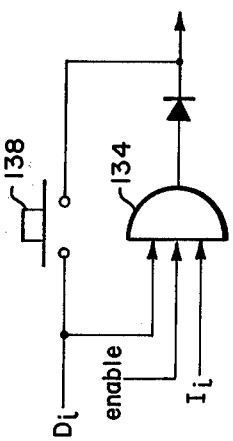
FIG. 11 is a schematic diagram of a circuit suitable for use in the interface unit of FIG. 10.

One element suitable for use in interface unit 126 is shown in FIG. 11. Calculator 128 and keyboard 130 (FIG. 10) may be of the type used in conventional electronic desk calculators and FIG. 11 illustrates, for one channel, how data may be entered into the calculator chip from decoder 124. For example, the calculator normally interrogates, at a high frequency, each of the keys of keyboard 130, by sequentially "strobing" the input to the key switches of the keyboard, and applying the output signal from the switches as input data to the calculator.

For digit "i" the strobe signal $D_i$ is periodically applied to keyboard switch 138 of FIG. 11. In the data channel shown in FIG. 11 the "ith" digit ($I_i$) of the speed data from binary to digital decoder 124 (FIG. 10) is applied through AND gate 134 during the ith strobe signal ($D_i$) period if an enable signal is applied from calculator chip 128. The strobe function in chip 128 is enabled by the trailing edge of the K gate from flip-flop 90 of FIG. 5. To summarize, to compute a function, as designated by keyboard 130, of an object's speed, the calculator at a preprogrammed time enables each of the interface channels (one shown in FIG. 11) and sequentially accepts the speed data which is used as one parameter in the preprogram computations.

Chip 128 can be preprogrammed with measurement parameters and equations, and with additional input parameters identified by keyboard labels to facilitate rapid calculations at the test and measurement site. For example, for a golf club swing, a distance equation including standard ball weight, impact, and ballistics data can reside in the chip's firmware. Various club weights can be selected by keyboard entry with keys labeled by club weight, e.g., 'C-1', 'C-2', 'D-1', etc. With the velocity value input to the calculator at the completion of a test swing, ball flight distance can be calculated by entering the appropriate club weight at the keyboard. Similarly, the computer chip can be preprogrammed and coupled to receive signal $N_o$ and to therefrom compute functions involving the object's acceleration as well as speed.

Figure 12:
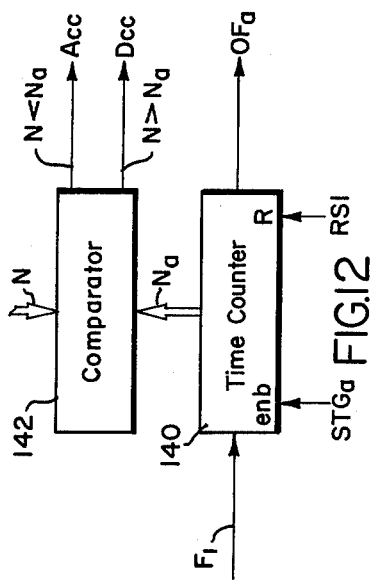
FIG. 12 is a block diagram of the acceleration subsystem of FIG. 1.

Referring again primarily to FIG. 1, the implementation of an optional acceleration "flagging" channel will now be considered. As there shown, a third pulsed beam 13 from a transmitter 36 is processed by a receiver 38, a missing pulse detector 40, and a time gate generator 42 in exactly the manner as previously described for the generation and processing of beams 14 and 20. As illustrated in FIG. 4, the signal $STG_a$ is determined by the interval between the occurrence of output pulses $t_a$ and $t_1$ from missing pulse detectors 40 and 24, respectively. As shown in FIG. 12, clock pulses $F_1$ are applied to acceleration time counter 140 which is enabled by the signal $STG_a$ from time gate generator 42 (FIG. 1), and is reset by signal RS1 from FIG. 5. Hence the count $N_a$ in counter 140 is indicative of the time it takes for the object to pass through the zone defined by beams 13 and 14 (FIG. 1). The signal $N_a$ and the signal N from time counter 82 of FIG. 5 are compared in magnitude comparator 142, and the output signal designated Acc is high if the time interval N is less than the time interval $N_a$. In other words, if the object's speed through the zone defined by beams 14 and 20 (FIG. 1) is greater than the speed measured in the zone defined by beams 13 and 14, the object is accelerating. If N is greater than $N_a$, the output signal designated Dcc is high. Output signals Acc and Dcc are applied to the " " and "—" display unit 104 of FIG. 8. For the zero acceleration case, neither of signals Acc or Dcc are high and so no acceleration sign is illuminated.

Referring now to FIG. 7, as there shown, transmitter sensor unit 150 comprises the transmitters shown in FIG. 1, and receiver sensor unit 152 comprises the receivers and missing pulse detectors. Units 150 and 152 are rigidly interconnected by a yoke or frame member 153 so that there is optical alignment therebetween. Although illustrated for a golfing application, it is noted that the units 150 and 152 may be mounted in any plane, horizontal through vertical, as required for a given application. For example, for baseball and tennis applications and units would preferably be in the vertical plane. For bowling, golf and football applications the units 150 and 152 would be mounted in a horizontal plane. In addition, for bowling applications, units 150 and 152 would preferably be rigidly mounted on opposite sides of the bowling alley.

Electronic and display assembly 154 contains the units of FIG. 1, other than those in units 150 and 152, except for computation unit 34 which preferably would be a separate assembly (not shown in FIG. 7). The distance between units 150 and 152, as well as the spacing between beams 13, 14 and 20 are design parameters selected according to the requirements for a given application. For the illustrated embodiment, adjacent beams are separated by 1.76 inches, and units 150 and 152 are 2.5 feet apart. For golf applications, the beams are disposed so that they are above the tee position of the ball 160 and the lower end of the club's shaft, rather than the head, interrupts the beams.

Thus having described a new and improved system for measuring characteristics of an object's motion, what is claimed is:

1. A measurement system adapted for measuring characteristics of an object's motion through a preselected zone, said system comprising:

transmitter means for transmitting first and second substantially parallel, synchronously pulsed beams of infrared energy such that said preselected zone is defined by said beams, and each beam has a predetermined fixed time interval between its energy pulses;

receiver means disposed for receiving, in the absence of beam interruptions, a portion of the transmitted energy in said first and second beams, and for providing output signals indicative thereof;

missing pulse detector and time gate generator means, responsive to said output signals from said receiver means, for producing a time gate signal which commences during the interpulse interval following the first missing pulse in the received energy from the first beam and which terminates during the interpulse interval following the first missing pulse in the received energy from the second beam; and speed subsystem means, responsive to said time gate signal, for producing a first speed signal indicative of the speed of the object as it passes through said zone.

2. The system of claim 1 wherein said first and second beams are spaced less than 12 inches apart and each beam has a pulse repetition rate in excess of 50,000 pulses per second.

3. The system of claim 1 wherein said beams are pulsed at a repetition frequency which is sufficiently high that the minimum time for passage of the object through the beam is at least fifty times greater than the interpulse period between pulses of said beams.

4. The system of claim 1 further comprising means for inhibiting the production of a subsequent time gate signal for a period established by preselected criteria.

5. The system of claim 1 wherein said speed subsystem includes:

a source of first clock pulses;

a first counter means for counting the first clock pulses during the period of said time gate signal, so as to produce a count signal N;

a second source of clock pulses $F_o$;

second counter means for responding to said count signal N and clock pulses $F_o$ to produce output pulses representative of $F_o/N$;

third counter means for producing a gate signal K having a predetermined duration; and fourth counter means for counting the $F_o/N$ pulses during the duration of the gate signal K;

whereby the count in said fourth counter means is proportional to the speed of the object as it passes through said zone.

6. The system of claim 1 wherein said transmitter means includes means for transmitting a third pulsed beam of infrared energy which is synchronized with and parallel to said first and second beams; said receiver means includes means for receiving, in the absence of beam interruptions, a portion of the transmitted energy in said third beam and for producing additional output signals indicative thereof; said missing pulse detector and time gate generator means includes means for producing a second time gate signal which commences during the interval following the first missing pulse in the received energy from the third beam, and which terminates during the interval following the first missing pulse in the received energy from the first beam; and further including means responsive to said second time gate signal for providing a second speed signal indicative of the speed of the object as it passes between said third and first beams; and comparator means for comparing said first and second speed signals and for providing an output signal which is indicative of the acceleration of the object as it passes between said third and first beams.

7. The system of claim 1 wherein said transmitter means and said receiver means are rigidly interconnected so that there is optical alignment therebetween.

8. The system of claim 1 further comprising calculator means for responding to said first speed signal and to predesignated values and functions for computing designated functions of said first speed signal.

9. The system of claim 1 further comprising display means responsive to said first speed signal for displaying an indication of the speed of the object.

10. The system of claim 9 further comprising means for sensing a time gate signal which exceeds a preselected duration, and means for inhibiting the display of an indication of a speed value resulting therefrom.

11. The system of claim 9 wherein said display means includes means for sensing a zero value in the most significant digit of the first speed signal and for inhibiting the display of said most significant digit value.

12. The system of claim 9 wherein said system includes a source of prime power; means for sensing a low voltage condition of said source; and means for causing the display indication to flash in response to a sensed low voltage condition.

13. A measurement system adapted for displaying the speed value and an indication of the acceleration of an object as it passes through a predetermined zone, said system comprising:
   transmitter means for transmitting three parallel beams of electromagnetic energy such that said first and second zones are defined by said beams;
   receiver means for receiving, in the absence of beam interruptions, the transmitted energy in said three parallel beams, and for producing output signals indicative thereof;
   means responsive to the output signals from said receiver means, for providing first and second speed signals indicative of the speed of said object, as it passes through said first and second zones, repsectively;
   comparator means for comparing said first and second speed signals and for producing an acceleration signal which is indicative of the acceleration of the object as it passes through said first and second zones; and
   means for displaying said first speed signal and said acceleration signal.

14. The system of claim 13 further comprising means for sensing when the speed of the object is below a preselected value and for inhibiting the display of the first speed value and the acceleration signal for objects whose speed is below said preselected value.

15. A system for measuring the speed of an object as it passes through a preselected zone, said system comprising:
   means for transmitting first and second beams of pulsed electromagnetic energy such that said preselected zone is determined thereby;
   receiver means disposed for receiving, in the absence of beam interruptions, a portion of the transmitted energy in said first and second beams and for providing output signals indicative thereof;
   missing pulse detector and time gate generator means, responsive to said output signals from said receiver means, for producing a time gate signal which commences during the interpulse interval following the first missing pulse in the received energy from the first beam and which terminates during the interpulse interval following the first missing pulse in the received energy from the second beam;
   speed subsystem means for producing a first speed signal indicative of the speed of the object as it passes through said zone; and
   means for inhibiting the production of a subsequent time gate signal until the end of the first preselected interval following the start of the preceding time gate signal or until the end of a second preselected interval following the end of the preceding time gate signal, whichever occurs first.

16. A system for providing a signal which is indicative of the time it takes an object to pass through a preselected zone, said system comprising:
   transmitter means for transmitting first and second substantially parallel, synchronously pulsed beams of infrared energy such that said preselected zone is defined by said beams, and each beam has a predetermined fixed time interval between its energy pulses;
   receiver means disposed for receiving, in the absence of beam interruptions, a portion of the transmitted energy in said first and second beams, and for providing output signals indicative thereof;
   missing pulse detector and time gate generator means responsive to said output signals from said receiver means for producing a time gate signal which commences during the interpulse interval following the first missing pulse in the received energy from the first beam and which terminates during the interpulse interval following the first missing pulse in the received energy from the second beam; and
   means responsive to said time gate signal for producing a signal indicative of the time it takes the object to pass through said zone.

* * * * *